Patented Nov. 14, 1939

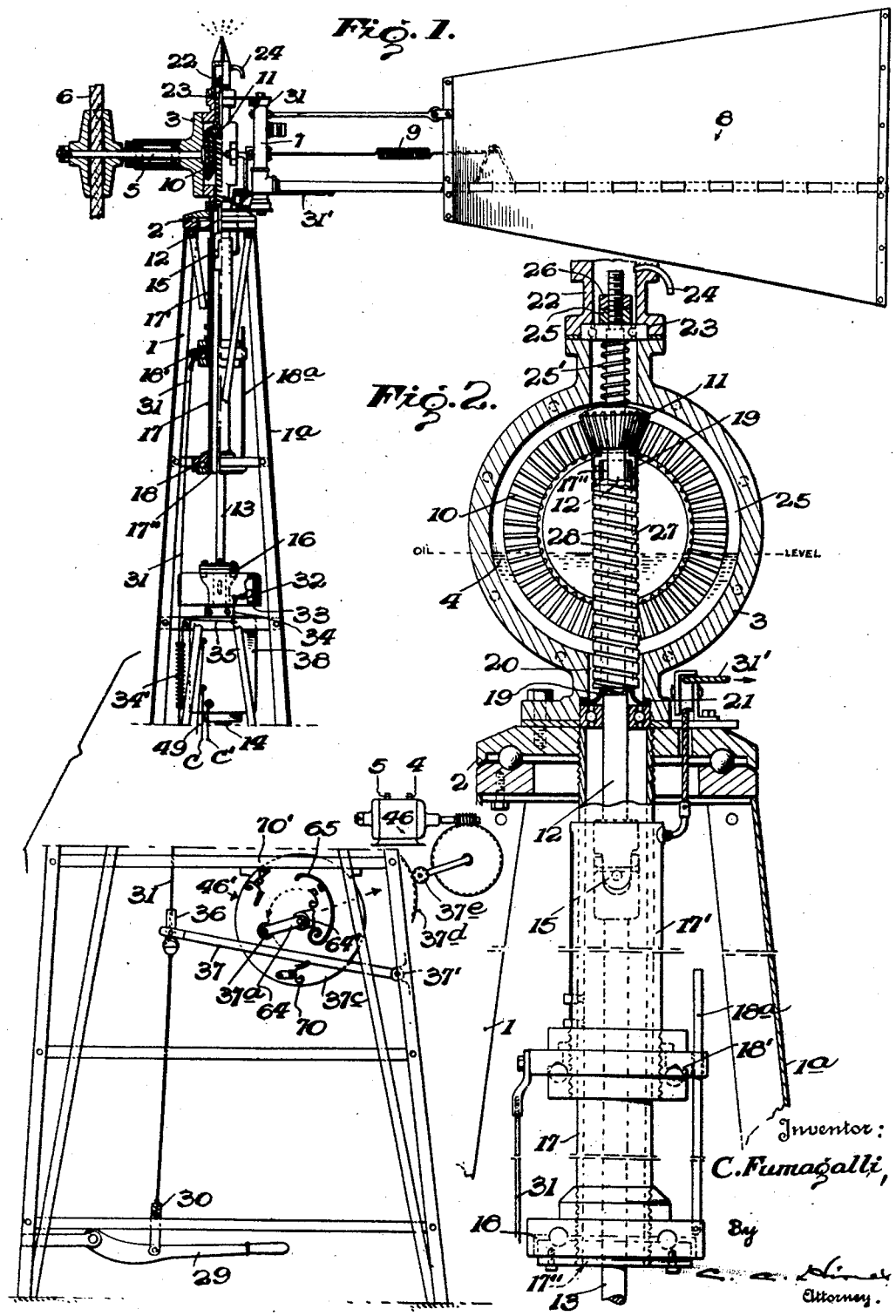

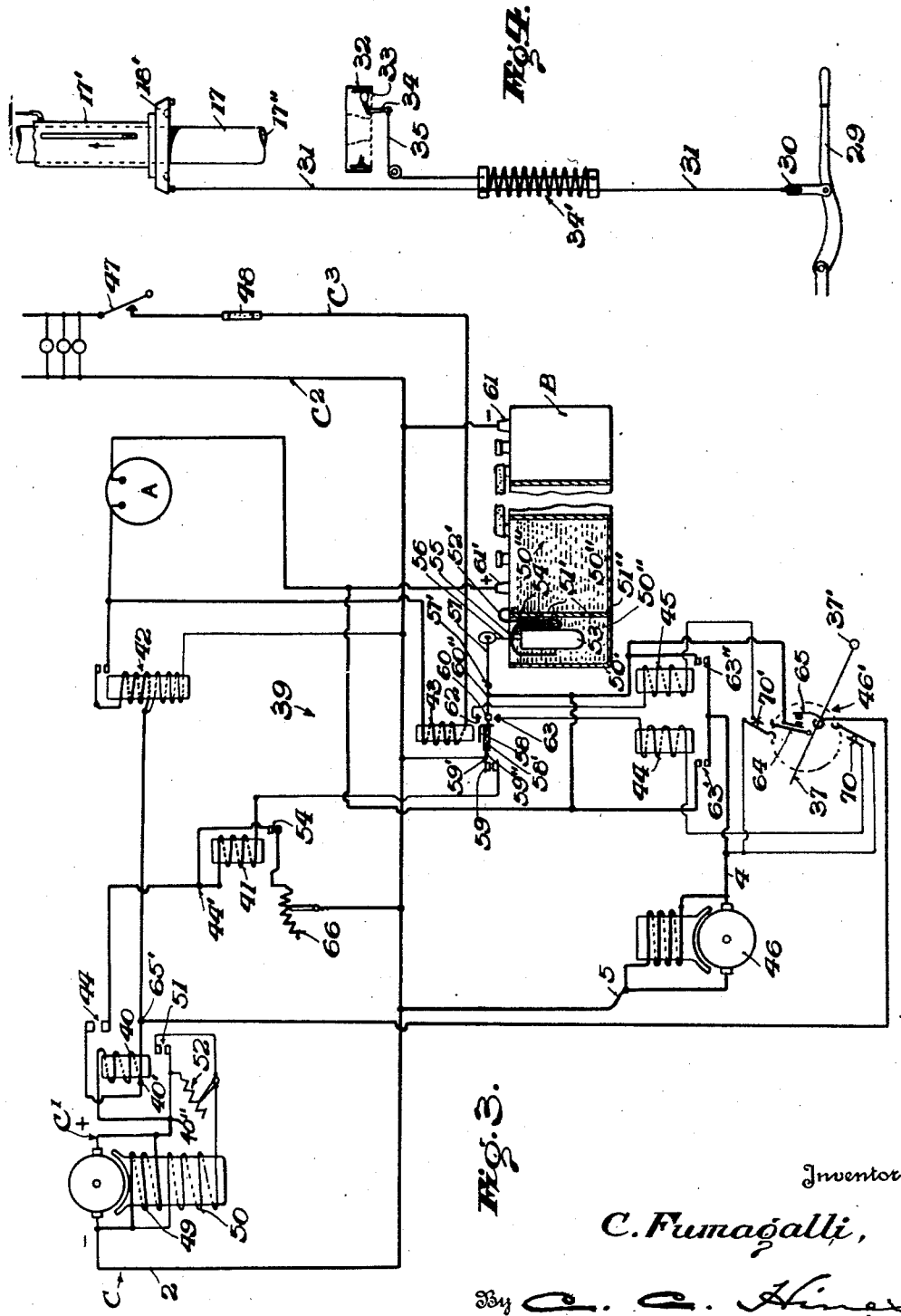

2,179,885

UNITED STATES PATENT OFFICE 2,179,885

WINDMILL AND WINDMILL ELECTRIC GENERATING AND REGULATING STORAGE SYSTEM

Charles Fumagalli, Guatemala City, Guatemala

Application October 29, 1937, Serial No. 171,776

19 Claims. (Cl. 290—55)

This invention relates to improvements in windmills and in windmill electric storage regulating and generating systems.

One object of the invention is to provide a windmill driven electric generating system for generating and furnishing electric current for battery charging, lighting and power purposes which is simple and inexpensive of construction, reliable and efficient in action, which may be manually thrown into and out of action, and which is also automatically controlled to furnish an adequate supply of current at all times and to prevent damage to the working parts thereof.

Another object of the invention is to provide a windmill structure which embodies a novel construction of transmission gearing and means for efficiently lubricating the same over a long period of time and preventing loss of lubricant by leakage or from other causes or contamination of the lubricant and clogging of the gearing by access of dirt, dust or other foreign substances thereto.

Still another object of the invention is to provide a windmill structure which is easy running, will transmit high power at low speeds, which may be manually thrown into and out of action in a ready and convenient manner, which is flexible and mechanically and automatically forced in and out of action to prevent injury to parts thereof from running strains, and in which the transmission gearing is adjustable to compensate for wear of the gears whenever occasion requires.

Still another object of the invention is to provide a novel windmill-generator construction in which the generator operates to generate current at low speed and to act automatically as an electric brake at varying and adjustable speeds to govern the speed of the windmill to keep the speed within safe limits and to prevent excessive speed.

Still another object of the invention is to provide a novel type of generator which will automatically regulate and control the electric and windmill systems and which may be governed in operation by the system in such manner as to regulate its generating action according to wind and battery charge conditions to prevent battery overcharge while maintaining proper relation between generator and battery voltages as to secure maximum efficiency of the system from all winds of sufficient power regardless of varying wind velocities.

Still another object of the invention is to provide means for automatically stopping the windmill when the battery is fully charged and for automatically starting the windmill regardless of the state of charge of the battery when lamps or current driven elements causing current drain on the system are set into action, so as to maintain a predetermined high battery charge condition and an efficient working condition of the system.

Still another object of the invention is to provide means governed by conditions of the battery for preventing overcharge and overheating of the battery without reducing the efficiency of the generator and for entirely stopping the action of the windmill as circumstances may require.

Still another object of the invention is to provide novel switch and starting means controlled by battery conditions and service conditions of the system whereby the operation of the system may be automatically controlled for battery charging and current supplying actions while meeting service and safety demands in a most efficient manner.

Still another object of the invention is to provide means governed manually, or governed automatically according to wind and storage conditions of a system supplied with current by the generator, for establishing a braking action of a variable character to cause the propeller to shift its position relative to the wind to vary the windmill speed as required.

Still another object of the invention is to generally improve and simplify the construction and increase the working efficiency of systems of this character.

With these and other objects in view, the invention consists of the features of construction, combination and arrangement of parts, hereinafter fully described and claimed, reference being had to the accompanying drawings, in which:

Fig. 1 is a view of the windmill structure and coacting parts of its control mechanism.

Fig. 2 is a vertical section through the transmission gearing and associated parts.

Fig. 3 is a diagrammatic view of the electrical current supplying and automatic control system.

Fig. 4 is a view showing certain parts of the wind wheel mechanism.

Referring now more particularly to the drawings, 1 designates the windmill frame at the top of which is a rotary turntable 2 the movable member of which carries the rotary windmill head 3. Antifriction bearings are interposed between the fixed and movable members of the turntable to ensure easy rotation of the head. The head 3 is chambered to form a gear casing and reservoir for a body of lubricating oil 4 occupying the lower portion of the chamber. In the head is mounted the propeller shaft 5 carrying the propeller 6, and to the head is hinged, as at 7, the tail vane or rudder 8 normally held in the plane of motion of the propeller by the spring 9.

Driven by the propeller shaft 5 is a transmission gearing disposed in the chambered head 3 and comprising a vertically disposed drive gear 10 on said shaft which meshes with a gear pinion 11 feathered or otherwise fitted to slide upon and rotate with the upper shaft section 12 of the windmill power transmission shaft which comprises also an intermediate section 13 and a lower section 14. The upper shaft section 12 is connected to the intermediate shaft section 13 by a universal joint 15 of a type to allow slight relative up and down as well as universal lateral motions of said shaft sections, while the intermediate shaft section 13 is connected to the lower shaft section 14 by an antifriction bearing type of universal joint 16 allowing similar movements of said shaft sections. These movements are sufficient to compensate for seasonal expansion and contraction of the parts, as well as to allow sufficient flexion of the shaft under service strains to prevent binding from such cause and to ensure an easy turning of the shaft at all times.

Surrounding the intermediate shaft section 13 and lower end of upper shaft section 12 is a supporting and guide sleeve 17. This sleeve 17 extends at its upper end through the rotary plate of the turntable 2 with which it turns and is journaled at its lower end in an antifriction bearing 18 on the frame. To said upper end of the sleeve 17 or to the rotary plate of the turntable is connected the lower end of a second sleeve or sleeve extension 19 which is arranged in axial alinement with the sleeve 17 and projects upwardly through a neck opening 20 in the base of the head 3 into the gear and oil chamber of the head. This tube extension 19 surrounds the upper shaft section 12 up to a point just below the pinion 11, and said sleeves 17 and 19 are disposed in spaced relation to the respective shaft sections 12 and 13 to provide an air feed space or passage 17" between the shaft sections and sleeves. The sleeve 19 is of less diameter than the neck opening 20, the joint between which and the said rotary turntable plate is closed by packing 21 sealing the neck opening against leakage of oil from the gear chamber at this point. The sleeve 17 through its points of engagement with the turntable 2 and bearing 18 forms a stable support to prevent rocking or tilting of the head 3.

The head or gear and oil chamber 3 may be formed of suitable sections united in an air, water and oil tight manner. It is provided at its top with a bonnet 22 enclosing an anti-friction bearing 23 for the upper end of the shaft section 12, said bonnet having a restricted air vent 24. The upper end of the shaft section 12 is slidable in and rotatable with the rotatable member of the bearing 23 and above the same is threaded to receive an adjusting nut 25 and a lock nut 26. Between the rotatable plate of the bearing 23 and the gear pinion 11 is a coiled spring 25' which holds the pinion 11 pressed into engagement with the gear 10. By adjustment of the nut 25 the shaft section 12 may be slidably adjusted in the bearing 23 to regulate the tension of the spring 25' and cause it to maintain the pinion 11 in close meshing engagement with the gear 10 and to compensate for wear of said gears when occasion requires. Fixed airtight at its upper end to the gear pinion 11 and enclosing the sleeve 19 is a rotary pump and oil distributor and economizer comprising a tubular member 27 having an internal spiral blade or rib 28 running in close relation to the outer surface of sleeve 19, the lower end of said member 27 being in open communication at its top with the sleeve 19 and at its bottom, within the neck 20, with the bottom of the oil containing space of the head or gear chamber.

The gear elements and the above described parts of the lubricating means operate as follows:

The gear 10 as it revolves agitates and splashes about the oil in the reservoir and distributes the oil to the pinion 11, whereby the gear elements themselves are constantly lubricated. As the pinion 11 and shaft section 12 rotate the tube 27 rotates therewith, its spiral rib 28 turning about the sleeve 19 and operating to force the oil contained in said tube downward and through the bottom end of said tube back into the oil reservoir. In such operation of the tube 27 a partial vacuum is created at the top of the tube, causing air to be drawn upwardly through the sleeves 17 and 19 into the top of the tube. This air is forced by its pressure and the action of the rib 28 downwardly with the oil, the air discharging at the bottom of the tube bubbling upward through the body of oil in the reservoir to the space above at the top of the reservoir, from which the excess air discharges through vent 24. The tube thus acts as an oil and air pump by which air is mixed with the oil to produce in the top of the reservoir an atmosphere of oil froth or bubbles whereby particles of the oil are carried up by air to a high level to lubricate the bearing 23 and upper end of the shaft section 12. This action of the air on the oil also tends to lighten the body of oil so as to spread it in the form of a film over the surfaces to be lubricated and so as to prevent down pressure of the oil at the neck of the tube and liability of leakage where leakage is most liable to occur. Conservation in the use of oil is thus effected and, as the oil is enclosed in a sealed chamber, it is also protected against the access of dust, dirt and other foreign elements thereto, preventing clogging or binding of the parts and ensuring a long period of lubrication of the gearing on each filling or replenishment of the reservoir. The windmill frame and parts carried thereby may be enclosed by a casing or cover 1a to protect it and said parts from injury and the action of the elements.

At the base of the tower is a pivoted hand lever 29. To this lever, through the medium of a tension spring 30, is connected the lower end of the lower section of a pull cable 31 which is attached at its upper end to the stationary plate of an antifriction bearing 18' arranged at the lower end of a pull sleeve 17' coupled to the sleeve 17 to slide thereon and rotate therewith. To this sleeve 17' is connected the lower end of an upper pull cable section 31' which passes upward over suitable guides and is connected at its upper end to the hinged tail vane. A guide rod 18a fixed to the bearing 18 and with which the stationary plate of the bearing 18' is slidably engaged guides the latter-named plate and holds it from rotation. As long as the tail vane is held by the spring 9 and action of the wind in line with the propeller and at right angles to the plane of motion of the propeller the propeller may rotate at its maximum speed allowed. By means of the lever 29, which may be manually swung past its pivotal center to a locking position, the vane 8, through the pull connection formed by the sleeve 17' and cable sections 31 and 31', may be swung horizontally to a position at right angles to its normal position and parallel with the plane of motion of the propeller. On releasing the lever the vane will be swung back into operative position by its spring 9. Thus the wind wheel may be manually thrown into or out of operation at will. A brake device is also provided for holding the propeller against rotation. This comprises a rotary brake drum 32 on the shaft section 14 engageable by an internal expanding brake band 33 on the frame, which band 33 is operable by a lever 34 coupled by a pull cable 35 through a compensating spring connection 34' with the lower cable section 31, so that when the cable 31 is drawn upon to swing the tail vane to an inoperative position the band brake will be applied. The character of the brake band compensating spring 34' connection is such that the brake band is completely applied at the completion of pull of cable 31, or at the time the tail vane reaches its inoperative position. In the length of the cable 31 is also a slotted coupling 36 loosely receiving the free end of a pivoted lever 37 operable for automatically throwing the wind wheel into and out of action as hereinafter described.

The lower shaft section 14 constitutes the armature shaft of an electric generator 38. The generator which is of a novel type is arranged in a current storage power supply and controlling circuit generally designated 39, and shown in detail in Fig. 3. This circuit includes besides the generator main input conductors C, C' and output conductors C2, C3, an ammeter A, a combined starting, storage and control battery B, a series of relays or automatic electromagnetic switches 40, 41, 42, 43, 44, 45, a starting motor 46, an automatic motor control device 46', a manual cutout switch 47 and one or more protector fuses 48. This circuit may supply current to lamps as shown, and to any suitable number and types of devices to be operated or driven. The generator, as stated, is of special type and is designed for varying speeds and braking actions, said generator having a main shunt winding 49 and an auxiliary regulating shunt winding 50.

The flow of current from the generator to the battery B is through an electromagnetic regulating switch including a series coil 40 and switch contacts 51 arranged in a shunt circuit in which the shunt winding is arranged, said circuit also including a variable resistance 52. A portion of the current flowing through conductor C' is diverted at 40'', such portion of the current passing through adjustable resistance 52, which energizes shunt 50 to a certain potential so as to regulate the speed at which generation will begin according to the power developed under different wind speeds and variations in the density of the air at different altitudes. This adjustable resistance provides a most efficient and sensitive means of generating electric current at all speeds depending upon the wind density and speed by adjustment of said resistance 52.

At a certain high rate of current generation and when the current reaches a certain intensity, coil 40 is energized to effect the closing of contact switch 51 so that another portion of the current will flow from point 40 through said contacts 51 without passing through resistance 52 energizing the shunt coil 50 to a sufficient intensity to produce a magnetic brake action of greater or less degree, according to the current intensity, opposing the rotation of generator armature which regulates rotation and direction of windmill propeller.

The regulation by means of the shunt circuit, which normally diverts a portion of the generator current from flow to the battery back to the generator to the degree established by the variable resistance, enables the braking action to be governed or regulated for service actions in a predetermined ratio to predetermined or prevailing wind velocities. Thus at low generator speeds and up to a certain high generator speed all current generated will be allowed to flow to the battery. When this speed is exceeded, the shunt winding 40 is energized to close contacts 44 and 51 so as to connect coil 41 with coil 40 for its action when occasion requires and so as to allow more or less of the current generated to flow to the battery, the remainder being shunted freely through the shunt circuit including coils 49 and 50 back to the generator to establish a flux resistance governed by the speed of the generator and circuit reactions for a braking action on the generator. This braking action will graduatively increase as the generator speed tends to increase at increased speed velocities of wind. By this braking action which is proportional to the speed of the propeller and the electrical resistance set up to the action of the generator, a retarding action on the windmill shafts and transmission gearing 10—11 is established by which the resistance of adjustable spring 9 is overcome and by which the propeller is forced to turn to one side more or less out of the path of the wind, which action is allowed by rotation of the head on the turntable. Thus through this automatic control of the generator action and through it the control of the propeller action excess speed of the propeller and excess generation of current and liability of damage to the windmill and battery will be prevented. By this generator control and braking action also gyroscopic action of the propeller is effectually prevented.

If the generator in action is generating a very high rate of current, this action if unduly prolonged will spoil the battery by overheating. This system is therefore provided with another means of regulation of the amperage charge to battery by means of a deviation of part of the current at a proper time in order to maintain a fixed charging rate to prevent said overheating. This automatic system will start functioning when the battery reaches a certain high charge or tends to become overheated. This system has the advantage of permitting the flow of the low charges of current at its complete capacity in accordance with low speed of the wind and it operates only when the charging current passes a certain limit deviating the excess of current back to generator negative C.

This manner of regulation does not affect the intensity of the field poles in order to obtain lower charging rates at low wind speed contrary to customary practice in other well known systems, which by weakening the poles require the dynamo to reach greater velocities, requiring high wind velocities in order to get the required high voltage which must be greater than the battery voltage so that the battery can be charged. My system is provided for this purpose with control means as follows:

The battery B is provided with an auxiliary float cell 50' containing electrolyte 50'' up to the electrolyte level of its plate cells 50''', the cells 50'' being in communication with the upper portion of said float cell through the medium of a gas vent tube 52' and by means of holes 51', in wall 51'' allowing flow of the electrolyte between said cells 50' and 50'''.

In the cell 50' is a float 53 over which is telescopically superimposed a bell 54 with the upper portion of which the delivery end of the tube 52' communicates. In the crown portion of the bell is a small vent opening 55 of calibrated size to allow vent escape of a certain amount of gas within a predetermined time. Connected to the float 53 and projecting upwardly from the cell 50' is a stem 56 connected to one end of a switch lever 57 centrally pivoted at 57'. The other end of lever 57 has attached thereto a contact 60 which is connected to positive pole 61' of battery B by wire 60". To lever 57 is also fastened a soft iron armature plate 58, and below it and fastened to the lever by insulating material 58', is a flexible contact member 59" that is connected by wire 59' to negative pole 61 of battery B, and to said flexible contact member 59" is attached a contact 59 movable toward and from a contact 59".

The electromagnets 40 and 41 act in combination with the resistance 66, contacts 44, 54a and 59, compound floats 53 and 54, vent hole 55, and float chamber 50' of battery B. When the battery is being rapidly charged at a high charging rate and its electrolyte reaches a certain high specific gravity point, or the battery starts gassing from this or any other cause, the compound floats 53 and 54 are raised and operate lever 57 to close contacts 59 and 59". When contacts 59 and 59" close a flow of current is established to energize coil 41 which remains inactive at low charging rates until at a certain high rate of generation a high charge of current flows through 40 and causes the contacts 44 to close. This flow of current through the coil 41 causes closing of contacts 54a. A portion of the current from conductor C' may flow through the coil 40, through contacts 44 and via by-pass 44a through contacts 54a and to variable resistance 66 to the negative of generator C. This working action, as previously explained, is effected at a certain state of charge of or upon overheating and consequent gassing of the battery. This regulating action acts by diverting the flow of a portion of the current back to the generator to establish a flux resistance against rotation of the generator for an electrical braking action to decrease the speed of the windwheel and thereby lower the charging rate to prevent overheating of the battery, but in any case if any overheating of the battery occurs and the generation of gases continues the gases collecting in the hermetic cell 50" will flow through tubes 52' under the bell float 54 and elevate the same to a sufficient extent to depress the contact carrying end of lever 57 to engage contacts 63—60, which energize coil 44' to stop the operation of the propeller until the battery gassing stops or decreases sufficiently to allow float 54—53 to descend into the electrolyte and to raise the contact carrying end of lever 57 to bring into engagement contacts 60 and 62 and energize coil 45, thus operating the starting mechanism to start the charging of the battery again. The construction of the stopping and starting mechanism will now be specifically explained:

The lever 37 is pivoted at its lower end to the tower at 37' and at its upper end to coupling 36 and it is governed in movement downward by an eccentric lever 64 carrying a rotating roller 37a. Said lever 64 is mounted on a shaft 64' that passes through the center of a stationary insulation material disk 37c and carries a gear 37d which is driven by transmission gear 37e at 600 to 1 ratio from a small electric motor 46.

The insulated material disk 37c is mounted so that eccentric lever 64 acts in its orbit of rotation to operate three mechanical switches 70, 70' and 65 operated by contact therewith of roller 37a. Switches 70 and 70' by means of wires are connected in between and through motor 46 to battery negative 61 and to the automatic mechanism operated by action of compound floats 53 and 54, which operates the stopping and starting mechanism by supplying power current to motor 46 in a determined way.

The operation of the parts governing the action of the starting and stopping mechanism is as follows:

Assuming battery B to be in a discharged state and the brake control lever 37 in released position, the propeller, in a working action, rotates generator which generates electrical energy which passing to battery B changes the specific gravity of electrolyte composition 50" to a heavier gravity that raises the combined floats 53—54. As the electrical charging rate is not yet regulated in any manner by the regulating means in the circuit except by flux braking control of the generator through the variable resistance 52, all the current generated will be fed to the battery at a high rate to cause a fast charging of the battery B up to a certain degree, say three-fourths of its full charge capacity, after which the battery will be protected from overheating and injury by the regulating action of the parts previously described. When the charge reaches about three-fourths of the full charge battery capacity, coil 41 is energized to close contacts 54a and the system operates to cause flow of current through resistance 66, so that the battery will only be supplied with a fixed regulated amount of current at high speeds and full amount at low speeds, that is, a low amperage, until battery reaches its full charge, then the electrolyte on reaching its full density will raise floats to their highest levels and cause contact points 60 and 63 to close the circuit including coil 44' and as lever 64 is in its normal upward position or at the starting point in its orbit of rotation the mechanical switch 70 is closed. Switches 63—60 and 70' being also closed and switch 65 open, current in a low amount will flow from battery positive 61' by wires to contacts 60 and 63 and to coil 44' and through switch 70' and motor 46 to battery negative 61. When coil 44' is energized it closed contacts 63' so that a heavier amount of current from battery positive 61' will flow through contacts 63' and operate motor 46. This current goes to battery negative 61, and the motor by its gears rotates in a counterclockwise direction the eccentric lever 64 which leaves the switch 70' connected, and on contacting with lever 37 forces it down, which pulls down control cable 31, which sets brake 33 and pulls on vane 8 to draw the propeller out of the wind and to stop it. As eccentric lever 64 is still driven by motor 46 it maintains its rotation until it meets switch 70 and brakes the circuit to and demagnetizes coil 44', with the result of breaking circuit contacts 63', switching current off and stopping the motor 46.

With the battery fully charged and the windmill out of operation and switch 70' left closed by the eccentric lever 64, the system is set for a control action which may be either one of two different kinds, as follows: One control action will occur when the circuit drain is low, as when a low amount of current is being used for supplying lights or other apparatus. Then the battery B will be slowly discharged, allowing floats 53 and 54 to descend to a certain point to shift lever 57 to bring the points 60 and 62 into contact, thus closing the circuit at that point and as switch 70' has been left closed by operation of eccentric lever 64, then the current will flow from battery positive 61' by wires through points 60 and 62 and through coil 45 and from coil 45 through switch 70' and through motor 46 to battery negative 61. By this means contact points 63" are closed and current flows from battery positive 61 through 63" and through motor 46 to battery negative 61, operating the motor and thereby the eccentric lever 64 for upward movement on the final half of its orbit of rotation to release mechanical brake 33 and allow tail vane 8 to swing into the wind. This movement is effected at about the one-fourth revolution point of eccentric lever 64. As lever 64 continues its counterclockwise motion and reaches its half revolution point its contact roller 37a releases switch 70 and allows it to close and then closes mechanical switch 65 to allow current to flow from battery positive 61' through said switch 65 and through winding 40 to plus pole C' of generator and through generator to negative pole C and back to battery negative 61, the generator thus being temporarily operated as a motor to give a starting movement to the propeller. Contacts 44 will not be closed during this operation, as the intensity of the battery current flowing to the generator is not strong enough to energize coil 40 and if this should casually happen it will not affect the system because contacts 59—59" are separated on account of lever 57 being raised to contact points 60—62 by the effect of battery discharge allowing floats 53—54 to move downward. As essentric lever 64 continues its rotation beyond the half-revolution point switch 65 will be released, thus breaking the flow of battery current to the generator after the propeller has been started into action. The lever 64 continues its movement, however, under force of motor 46 until it contacts with and opens switch 70' which breaks the motor circuit, thus stopping the motor. The windmill is thus started into action to generate current by action of the wind.

The second control action referred to occurs when a heavy current drain on the system is caused during a time when the widmill is out of action by cutting in of lights or the use of motors, and all discharging current will pass through magnet coil 43 which is in series with the output wires C2—C3. When this coil is magnetized to a certain degree it attracts armature 58, and pulls lever 57 upward making contact at points 60—62, thus magnetizing coil 45 and causing the starting motor 46 to be set into action in the manner already explained so that the windmill will be quickly started into action to replenish the battery with current and to keep the battery fully charged in accordance with the quantity of current generated and the amount discharged. The action here is the same as that occurring in the first control action with battery fully charged and the windmill out of operation, except that coil 43 controls the action for a quick throwing of the windmill into operation without waiting for the floats to descend through reduction of specific gravity of the electrolyte.

Relay 42 is a cut out relay whose contacts are normally closed when the generator voltage is greater than the battery voltage and whose contacts open when the battery voltage exceeds the generator voltage to prevent battery drain.

From the foregoing description, taken in connection with the drawings, the construction and mode of operation of my improved windmill and windmill electric generating and regulating storage system will be readily understood without a further and extended description and its multifold advantages will be apparent to those versed in the art. While the structural organization herein shown is preferred, it will, of course, be understood that changes in the form, construction, proportions and arrangements of the parts may be made, within the scope of the appended claims, without departing from the spirit or sacrificing any of the advantages of the invention.

What I claim is:

1. The combination of an electric generator, a wind wheel for driving the generator, an electric circuit having a storage battery adapted to be charged by the generator, and means controlled by the speed of the wind wheel and influenced by induced current reactions in the circuit at and above a certain speed of the generator and state of charge of the battery for imposing through such induced current reactions an electrical braking action on the generator.

2. The combination of an electric generator, a wind wheel, gearing actuated by the wind wheel for driving the generator, an electric circuit having a storage battery adapted to be charged by the generator, means controlled by generator speed for instituting a braking action on the generator influencing the gearing to throw the wind wheel more or less out of the wind, and means controlled by a state of the battery for stopping the wind wheel.

3. The combination of an electric generator, a wind wheel, gearing actuated by the wind wheel for driving the generator, an electric circuit having a storage battery adapted to be charged by the generator, means controlled by a certain state of the battery for diverting the flow of a portion of the current back to the generator negative, and means controlled by a certain state of the battery for stopping the wind wheel.

4. The combination of an electric generator, a wind wheel, gearing actuated by the wind wheel for driving the generator, an electric circuit having a storage battery adapted to be charged by the generator, means in said circuit for directing a portion of the generated current from flow to the battery when the generator exceeds a predetermined speed, and means controlled by such diverted portion of the current for effecting an electrical braking action by the generator on the wind wheel for regulating the speed of the wind wheel.

5. The combination of a motor driven electric generator, an electric circuit having a storage battery adapted to be charged by the generator, means controlled by the specific gravity of the battery electrolyte when a certain state of charge is reached for reducing the flow of current to the battery, and means controlled by a gassing condition of the battery for stopping the generator.

6. The combination of an electric generator, a wind wheel, gearing actuated by the wind wheel for driving the generator, an electric circuit having a storage battery adapted to be charged by the generator, means controlled by charge conditions of the circuit for controlling the generating action of or stopping the generator, and means operating regardless of charge conditions of the circuit for restarting the generator if stopped when a service demand is made on the circuit.

7. The combination of an electric generator having a brake winding, a wind wheel having gearing for driving the generator, an electric circuit including a battery adapted to be charged by the generator, and means acting under certain speed conditions of the wind wheel for exciting said winding for a braking action on the generator acting on the gearing to regulate the speed of the wind wheel and changing the direction of same with respect to wind direction.

8. In an electric power plant, a motor driven generator, a storage battery in circuit with said generator and adapted to be charged therefrom, means for rendering the motor operative or inoperative for driving the generator, means governed by the specific gravity of the battery electrolyte and at predetermined low and high charge conditions thereof for controlling the first-named means to render the motor operative or inoperative, and means operative when the generator is inactive during a high state of charge of the battery and upon a service drain being made upon the system for controlling the first-named means to render the generator motor operative to drive the generator.

9. In an electric power plant, a motor driven generator, a storage battery in circuit with said generator and adapted to be charged therefrom, control means for reducing the charging rate of the generator and for rendering the motor effective or ineffective for driving the generator, and means governed by the specific gravity of the battery electrolyte and its gassing condition determined by the quantity and rate of charge for controlling said control means to reduce the charging rate or to render the motor effective or ineffective for driving the generator.

10. In an electric power system, a generator, a battery in circuit with the generator and adapted to be charged thereby, a device for reducing the output of the generator, a switch for controlling said device, a switch for rendering the generator inactive, and a pressure controlled device connected to the battery and adapted to be operated by the pressure of gases generated by the battery to successively operate said switches at different relatively low and high pressures.

11. The combination of a main electric circuit, a generator in said circuit having an electromagnetic field coil, a circuit in shunt with the generator field and having a coil acting in opposition to the field coil to establish a flux braking action on the generator, and means for variably controlling the flow of current to the second-named coil to regulate the generator speed at which generation begins.

12. The combination of an electric generator having a brake winding, a wind wheel in gear with the generator for driving the same, an electric circuit including a battery adapted to be charged by the generator, and means comprising a shunt circuit and a resistance connected to the brake winding and connected to said circuit to receive a portion of the current supplied thereto from the generator for flow through said resistance to the braking coil to regulate the speed of the generator at which generation begins.

13. The combination of an electric circuit, a generator in said circuit, a battery in said circuit adapted to be charged by the generator, a wind wheel for driving the generator, and means in said circuit controlling the generator field for imposing an electrical braking action on the generator to regulate the position of the wheel in the wind according to wind velocity to govern the generator speed at which generation begins.

14. The combination of a motor driven electric generator, an electric circuit including a battery adapted to be charged by the generator, means in the circuit for normally establishing a flux braking potential acting on the generator to control and determine its speed at which charging begins, and means in the circuit and controlled by the state of charge of the battery when a certain high state of charge is reached for increasing said potential to control the generator for a reduction of its charging ratio.

15. The combination of a motor driven electric generator, an electric circuit including a battery adapted to be charged by the generator, and means in the circuit for normally establishing a flux braking potential acting on the generator to control and determine its speed at which generation begins.

16. The combination of a motor driven electric generator, an electric circuit including a battery adapted to be charged by the generator, and means in the circuit controlled by a state of charge of the battery for establishing an electric braking action on the generator to regulate its speed and charging rate.

17. The combination of a motor driven electric generator, an electric circuit including a battery adapted to be charged by the generator, means in the circuit for normally establishing an electrical potential acting to control the speed of the generator under the action of its driving motor to determine the generator speed at which generation begins, and means for regulating said means so as to vary the normal potential.

18. The combination of a motor driven electric generator, a shunt circuit connected across the field of the generator and including a braking coil acting in opposition to the field winding to oppose an electrical braking resistance to the action of the generator, said shunt circuit having normally open connections with the field winding, braking coil and main circuit, a resistance across the shunt circuit through which a predetermined amount of the generated current may pass to energize the braking coil, and means in the main circuit operating at a predetermined voltage higher than the generated starting voltage for closing said connections to the main circuit for flow of an increased amount of current in the shunt circuit through and about the resistance to the braking coil.

19. In an electric power system, a motor driven generator, a storage battery in circuit with said generator and adapted to be charged therefrom, and means directly influenced and governed by the state of the battery electrolyte at substantially high and fully charged states thereof, respectively for reducing the charging rate of the generator and stopping the charging action thereof.

CHARLES FUMAGALLI.